US006959351B2

(12) United States Patent
Gwilt et al.

(10) Patent No.: US 6,959,351 B2
(45) Date of Patent: Oct. 25, 2005

(54) HANDLING OF A MULTI-ACCESS INSTRUCTION IN A DATA PROCESSING APPARATUS

(75) Inventors: David John Gwilt, Waterbeach (GB); Bruce Mathewson, Papworth Everard (GB)

(73) Assignee: ARM Limited, Cambridge (GB)

( * ) Notice: Subject to any disclaimer, the term of this patent is extended or adjusted under 35 U.S.C. 154(b) by 378 days.

(21) Appl. No.: 10/405,495

(22) Filed: Apr. 3, 2003

(65) Prior Publication Data

US 2003/0221032 A1 Nov. 27, 2003

(30) Foreign Application Priority Data

May 23, 2002 (GB) ..................... 0211950

(51) Int. Cl.[7] ......................... G06F 13/00; G06F 12/00
(52) U.S. Cl. ...................... 710/110; 710/200; 711/152
(58) Field of Search ............... 710/22, 23, 37, 710/38, 52, 108, 110, 200, 240, 316; 712/31; 711/147, 152, 163

(56) References Cited

U.S. PATENT DOCUMENTS

| 5,727,172 | A | 3/1998 | Eifert et al. | |
|---|---|---|---|---|
| 6,052,763 | A | 4/2000 | Maruyama | |
| 6,473,849 | B1 * | 10/2002 | Keller et al. | ............ 712/30 |
| 2003/0033507 | A1 * | 2/2003 | McGrath | ............ 712/225 |

FOREIGN PATENT DOCUMENTS

| EP | 0366432 A2 | 5/1990 |
|---|---|---|
| WO | WO 96/03697 | 2/1996 |
| WO | WO 01/35210 A2 | 5/2001 |
| WO | WO 01/35210 A3 | 5/2001 |

* cited by examiner

Primary Examiner—Khanh Dang
(74) Attorney, Agent, or Firm—Nixon & Vanderhye P.C.

(57) ABSTRACT

The present invention provides a data processing apparatus and method for handling a multi-access instruction of the type which specifies that an access request of a first type and an access request of a second type should be performed without any intervening accesses taking place. The data processing apparatus has a processor operable to execute instructions, and a first master logic unit and a second master logic unit operable to process access requests generated during execution of those instructions. The access requests specify accesses to a slave device, with the first master logic unit being operable to access the slave device via a first bus, and the second master logic unit being operable to access the slave device via a second bus. Routing logic is provided to determine, for each access request, which master logic unit is to process that access request, the first master logic unit being arranged to process access requests of the first type, and the second master logic unit being arranged to process access requests of the second type. The routing logic is arranged in the event of execution of the multi-access instruction to cause both the access request of the first type and the access request of the second type specified by the multi-access instruction to be processed by the first master logic unit. Further, the first master logic unit is arranged, when processing the access requests of the multi-access instruction, to issue a lock signal which is used to ensure that the first master logic unit is granted sole access to the slave device whilst the first master logic unit is processing the access requests of the first and second type. This approach enables the benefits of providing a separate master logic unit for accesses of the first type and a separate master logic unit for accesses of the second type to be realised, whilst enabling the above-described multi-access instruction to be executed in the desired manner, i.e. by ensuring that the access requests of the first and second type specified by the multi-access instruction are performed without any intervening accesses taking place.

27 Claims, 4 Drawing Sheets

HANDLING OF A MULTI-ACCESS INSTRUCTION IN A DATA PROCESSING APPARATUS

BACKGROUND OF THE INVENTION

1. Field of the Invention

The present invention relates to techniques for handling multi-access instructions in a data processing apparatus, and more particularly to techniques for handling a multi-access instruction of the type that when executed causes both an access request of a first type and an access request of a second type to be generated, the multi-access instruction requiring that the accesses specified by those two access requests are made without any intervening accesses taking place.

2. Description of the Prior Art

When a processor is executing instructions, this may result in the generation of access requests specifying accesses to one or more slave devices. These slave devices are typically coupled to the processor via one or more interface units, with the access requests being passed to the appropriate interface unit for processing.

In a typical implementation, each interface unit would have an associated bus for communicating with the various slave devices, and an arbitration unit would be used to arbitrate between the various accesses being made by the interface units to ensure that only one interface unit has access to any particular slave device at any one time.

In a typical prior art implementation, one interface unit (also referred to herein as a master logic unit) would be responsible for processing access requests of both the first type and the second type, and hence upon execution of the particular type of multi-access instruction mentioned above, the access requests specified by that multi-access instruction would be routed to a single interface unit for execution. An example of such a multi-access instruction is a swap instruction, in this instance the access request of the first type being a read access request, the access request of the second type being a write access request, and the relevant slave device being a storage device such as a memory, an external register, a FIFO buffer, etc. The swap instruction specifies a read access request used to read data from an access address of the slave device into a first register of the data processing apparatus, followed by a write access request used to write data from a second register of the data processing apparatus into the access address of the slave device. The swap instruction requires that both the read access and the write access be made to the slave device without any intervening accesses to the slave device taking place.

In a typical prior art implementation, this can readily be achieved, since there would typically be a single read and write interface unit which is able to issue an appropriate locking signal to the arbitration unit to ensure that once it has been given access to the slave device, it can maintain sole access to the slave device whilst issuing both the read and the write access.

However, it is becoming desirable to increase the number of interface units, each being provided with their own bus for accessing the slave devices, so as to increase the bandwidth available for processing access requests, thus enabling an increase in performance, and increased flexibility. As an example, it is becoming desirable to provide within a data processing apparatus a separate data read interface and a separate data write interface, each provided with a separate bus for connection to the various slave devices. A segmented memory, for example, can then be considered as multiple slave devices, with this architecture allowing a read to one segment to occur via the read interface unit whilst simultaneously a write from another segment of the memory is occurring via the write interface. It will be appreciated that such an approach significantly increases the flexibility with which access requests can be processed, and can further yield significant performance benefits.

However, for multi-access requests of the above described type, for example a swap instruction, such an architecture presents a problem. Considering the example of the swap instruction, it can be seen that with the above architecture the read access request of the swap instruction would be issued to the read interface unit, whilst the write access request of the swap instruction would be issued to the write interface unit. Since the read and the write interface units use different buses for accessing the slave device (e.g. a memory), the read interface unit will need to release its lock signal after it has issued the read access request, in order that the write interface unit can then request access to the slave device to process the write access request. Since the swap instruction involves a read from a particular access address and then a write to that same access address, it is clear that the same slave device (e.g. the same memory segment) needs to be accessed by both interface units. This presents a problem, since it can no longer be ensured that an intervening access to that slave device will not occur between the read interface unit releasing its lock signal and the write interface unit gaining access to the slave device in order to process the write access request.

Accordingly, it would be desirable to provide a technique which enabled a first master logic unit to be provided to process access requests of a first type and a second master logic unit to be provided to process access requests of a second type, but which still enabled a multi-access instruction to be executed which required a first type access request and a second type access request to be processed without any intervening accesses taking place.

SUMMARY OF THE INVENTION

Viewed from a first aspect, the present invention provides a data processing apparatus comprising: a processor operable to execute instructions; a first master logic unit and a second master logic unit operable to process access requests generated during execution of said instructions, said access requests specifying accesses to a slave device, the first master logic unit being operable to access the slave device via a first bus, and the second master logic unit being operable to access the slave device via a second bus; routing logic operable to determine, for each access request, which master logic unit is to process that access request, the first master logic unit being arranged to process access requests of a first type, and the second master logic unit being arranged to process access requests of a second type; at least one of said instructions being a multi-access instruction executable to cause both an access request of the first type and an access request of the second type to be generated, the multi-access instruction requiring that the accesses to the slave device specified by the access requests of the first and second type are made without any intervening accesses to the slave device taking place; the routing logic being arranged in the event of execution of the multi-access instruction to cause both the access request of the first type and the access request of the second type specified by the multi-access instruction to be processed by said first master logic unit; the first master logic unit being arranged, when processing the access request of the first type and the access request of the second type specified by the multi-access instruction, to issue a lock signal used to ensure that the first master logic unit is granted sole access to the slave device whilst the first master logic unit is processing the access requests of the first and second type.

In accordance with the present invention, routing logic is provided to determine, for each access request, which master logic unit is to process that access request, the default position being that the first master logic unit processes access requests of the first type and the second master logic unit processes access requests of the second type. In the event of execution of a multi-access instruction of the type which requires both a first type access request and a second type access request to be processed without any intervening accesses taking place, the routing logic is arranged to cause both the first type access request and the second type access request specified by that multi-access instruction to be processed by the first master logic unit. Further, the first master logic unit is arranged in such circumstances to issue a lock signal which is then used to ensure that the first master logic unit is granted sole access to the slave device whilst the first master logic unit is processing those two access requests.

By this approach, it can be ensured that the improved bandwidth, performance, and flexibility resulting from the provision of both the first master logic unit and the second master logic unit, each with their own bus, can be realised, while still allowing the above type of multi-access instruction to be executed correctly, i.e. by ensuring that the access request of the first type and the access request of the second type can be made without any intervening accesses to the slave device taking place.

It will be appreciated that the routing logic can take a variety of forms. For example, the routing logic could be a single logic unit arranged by default to route access requests of the first type to the first master logic unit and access requests of the second type to the second master logic unit, but in the event of the above type of multi-access instruction, to ensure that both the access request of the first type and the access type of the second type specified by that multi-access instruction are routed to the first master logic unit.

However, in preferred embodiments, the routing logic comprises first routing logic operable to route access requests of the first type to the first master logic unit and to route access requests of the second type to the second master logic unit, and second routing logic operable in the event of execution of the multi-access instruction to cause the access request of the second type specified by the multi-access instruction to be routed from the second master logic unit to the first master logic unit for processing by the first master logic unit.

Preferably, in such preferred embodiments, the second routing logic is provided within the first master logic unit.

It will be appreciated that there are a variety of ways in which the access request of the second type can be caused to be routed from the second master logic unit to the first master logic unit. However, preferably, the second routing logic comprises requester logic operable to issue a request to the second master logic unit to cause the second master logic unit to route to the first master logic unit the access request of the second type specified by the multi-access instruction.

Since the above described type of multi-access instruction requires that the access request of the first type and the access request of the second type are processed without any intervening accesses to the slave device taking place, and given that the first master logic unit should not retain sole access to the slave device for any longer than is necessary so as not to adversely impact the performance of the system, it is preferable that the first master logic unit does not process the access request of the first type specified by the multi-access instruction until it is clear that the second master logic unit is in a position to provide to the first master logic unit the access request of the second type. In preferred embodiments the second master logic has a buffer for buffering access requests received from the first routing logic prior to processing of those access requests, the first master logic unit being arranged to defer processing of the access requests specified by the multi-access instruction until the buffer has been drained of any access requests not specified by the multi-access instruction.

It will be appreciated that the multi-access instruction will specify the order in which the various access requests specified by that multi-access instruction should be executed. Accordingly, it is possible that the access request of the second type may need to be processed before the access request of the first type. However, in preferred embodiments, the multi-access instruction specifies that the access request of the first type is to be processed before the access request of the second type.

In such preferred embodiments, the first routing logic is preferably arranged to defer providing to the second master logic unit the access request of the second type specified by the multi-access instruction until the access request of the first type specified by the multi-access instruction has been processed by the first master logic unit. By waiting until the access request of the first type has been processed by the first master logic before routing the access request of the second type to the second master logic unit, it can be ensured that in the event that the access request of the first type is aborted for any reason, the access request of the second type will not be issued to the second master logic unit.

However, it will be appreciated by those skilled in the art that, assuming appropriate mechanisms are put in place to remove from the second master logic unit the access request of the second type in the event that the access request of the first type aborts, it would not be necessary for the first routing logic to defer providing that access request of the second type to the second master logic unit until the access request of the first type has been processed. Instead, the first routing logic may be arranged to provide that access request of the second type to the second master logic unit once processing of the access request of the first type has been initiated by the first master logic unit.

In preferred embodiments, the first master logic unit is arranged to defer processing of the first access request specified by the multi-access instruction until the buffer of the second master logic unit has been emptied. By this approach, it can be ensured that when the time comes for the first master logic unit to process the access request of the second type, that access request will be the next access request to be received into the second master logic unit, and accordingly the second master logic unit will be in a position to provide that access request to the first master logic unit.

In such embodiments, the second master logic unit is arranged to issue a buffer status signal to the first master logic unit indicating whether the buffer is empty, this avoiding the requirement for the first master logic unit to issue requests to the second master logic unit in order to determine whether the buffer is empty.

It will be appreciated that the access requests of the first and second type may take a variety of forms, as may the first and second master logic units. However, in preferred embodiments the first master logic unit is a read interface unit, and the access requests of the first type are read access requests, whilst the second master logic unit is a write interface unit, and the access requests of the second type are write access requests. As mentioned earlier, by providing a read interface unit that is separate to the write interface unit, each having their own associated bus for accessing slave devices, it is possible for a read access to one slave device to take place simultaneously with a write access from another slave device.

It will also be appreciated that the multi-access instruction may take a variety of forms. However, in preferred embodiments, the multi-access instruction is is a swap instruction specifying a read access request used to read data from an access address of the slave device into a first register of the data processing apparatus, followed by a write access request used to write data from a second register of the data processing apparatus into the access address of the slave device. Since for both the read access request and the write access request, the same access address is involved, it is apparent that both access requests need to be made to the same slave device. In accordance with preferred embodiments, both the read access request and the write access request defined by the swap instruction are processed by the read interface unit, with the ability of the read interface unit to issue a lock signal to ensure that it is granted sole access to the slave device enabling correct execution of the swap instruction to be ensured (i.e. it can be ensured that no intervening accesses take place).

It will be appreciated that the slave device accessed as a result of the swap instruction may take a variety of forms. For example, the slave device may be a first-in-first-out (FIFO) buffer, a register external to the data processing apparatus, a memory, etc. However, in preferred embodiments, the slave device is a memory.

Viewed from a second aspect, the present invention provides a method of handling a multi-access instruction in a data processing apparatus having a processor operable to execute instructions, and a first master logic unit and a second master logic unit operable to process access requests generated during execution of said instructions, said access requests specifying accesses to a slave device, the first master logic unit being operable to access the slave device via a first bus, and the second master logic unit being operable to access the slave device via a second bus, the first master logic unit being arranged to process access requests of a first type, and the second master logic unit being arranged to process access requests of a second type, the method comprising the steps of: (a) executing the multi-access instruction to cause both an access request of the first type and an access request of the second type to be generated, the multi-access instruction requiring that the accesses to the slave device specified by the access requests of the first and second type are made without any intervening accesses to the slave device taking place; (b) routing both the access request of the first type and the access request of the second type specified by the multi-access instruction so as to cause both of those access requests to be processed by said first master logic unit; (c) whilst said first master logic unit is processing the access request of the first type and the access request of the second type specified by the multi-access instruction, issuing a lock signal operable to ensure that the first master logic unit is granted sole access to the slave device whilst the first master logic unit is processing the access requests of the first and second type.

Viewed from a third aspect, the present invention provides a computer program product carrying a computer program operative to control a data processing apparatus to handle a multi-access instruction in accordance with the method of the second aspect of the present invention.

BRIEF DESCRIPTION OF THE DRAWINGS

The present invention will be described, further by way of example only, with reference to a preferred embodiment thereof as illustrated in the accompanying drawings, in which.

DESCRIPTION OF A PREFERRED EMBODIMENT

Figure 1:
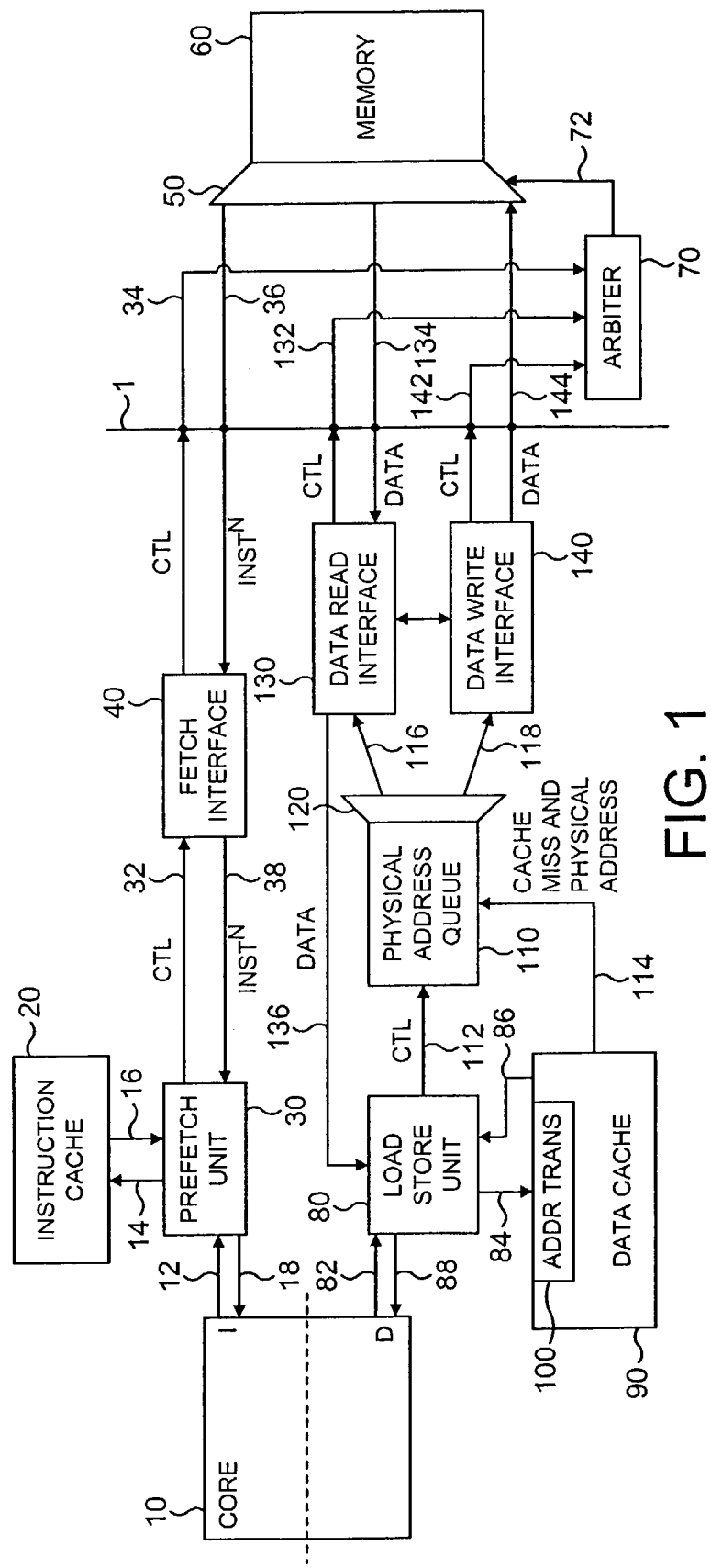
FIG. 1 is a block diagram illustrating a data processing apparatus in accordance with a preferred embodiment of the present invention.

FIG. 1 is a block diagram of a data processing apparatus in accordance with the preferred embodiment of the present invention. The data processing apparatus includes a processor core 10 which is arranged to execute a sequence of instructions. The prefetch unit 30 will seek to prefetch instructions for the processor core 10 and to output those instructions over path 18 to the processor core 10 for execution. The prefetch unit 30 will typically receive signals from the core 10 over path 12 indicative of the activities of the processor core, which the prefetch unit 30 can then use in determining which instructions to retrieve for the processor core. Typically, the prefetch unit 30 will try to retrieve any particular instruction from the instruction cache 20 by issuing an instruction request over path 14. If the instruction is within the cache, it will be returned over path 16 to the prefetch unit 30 from where it can be output to the core 10 over path 18.

However, if a cache miss occurs within the instruction cache 20, indicating that the instruction is not contained within the cache, this will cause the prefetch unit 30 to issue appropriate control signals over path 32 to a fetch interface 40 which will then seek to retrieve the instruction from memory 60. To perform the instruction fetch, the fetch interface 40 will output control signals over path 34 to an arbiter 70, specifying the access request, and the arbiter 70 will then at some subsequent point, having regard to any other requests that are concurrently been made for access to that memory 60, send a signal over path 72 to the multiplexing front end 50 of the memory 60, requesting the memory 60 to process the access request issued by the fetch interface 40. This will result in the required instruction being returned over bus 36 to the fetch interface 40 from where it is routed over path 38 through the prefetch unit 30 and onto path 18 into the processor core 10. The prefetch unit 30 may also cause that instruction to be placed within the instruction cache 20 at that time.

When processing instructions, the core 10 will need to retrieve data values to be manipulated by those instructions. Accordingly, the core will issue control signals over path 82 to a load store unit 80 indicating a data value required. The load store unit 80 will then issue an address for that data value over path 84 to the data cache 90, and if the data value at that address is currently within the data cache 90, that data value will be returned over path 86 to the load store unit 80, from where it is returned to the core 10 over path 88. The data cache 90 will typically incorporate some address translation logic 100, such as a table lookaside buffer (TLB) for converting a virtual address output by the core 10 into a physical address. In the event that a cache miss occurs within the data cache 90, indicating that the data value is not currently within the data cache, then a cache miss signal, along with the physical address, will be output over path 114 to a physical address queue 110.

The load store unit 80 is also arranged to issue control signals over path 112 to the physical address queue 110 providing information about the data value being requested, such that in the event of the physical address queue 110 receiving the cache miss and physical address over path 114, the physical address queue 110 can then handle the retrieval of that data value from memory 60 in the event of a load instruction, or the storing of a data value to the memory 60 in the event of a store instruction.

In accordance with preferred embodiments of the present invention, a separate read interface unit 130 and a separate write interface unit 140 are provided for handling read accesses and write accesses, respectively. The read interface unit 130 is connected via a bus 134 to memory 60 (and indeed to any other slave devices which the read interface unit may need to access), whilst the write interface unit 140 is connected via a separate bus 144 to the memory 60 (and indeed any other slave devices that it may need to access). The physical address queue 110 incorporates a demultiplexer 120 which is arranged to forward read access requests over path 116 to the data read interface unit 130, and to forward write access requests over path 118 to the data write interface unit 140.

When the data read interface unit 130 wishes to read data from the memory 60, it will issue the necessary control signals over path 132 to the arbiter 170 specifying the read access request, and similarly the data write interface unit 140 will, in the event that it needs to make a write access to the memory 60, issue the relevant control signals over path 142 to the arbiter 70. As mentioned earlier, the arbiter 70 is arranged to arbitrate between the various access requests received by the various interface units 40, 130, 140 (and indeed any other interface units provided by the data processing apparatus), so as at any point in time to only grant one of the interface units access to the memory 60.

Whilst for simplicity only one slave device has been illustrated in FIG. 1, namely the memory 60, it will be appreciated that in a typical implementation there will be multiple slave devices which can be accessed by the various interface units. For example, the memory may actually be implemented as a segmented memory, in which event each segment would preferably be considered as a separate slave device. In such an arrangement, it will be appreciated that the provision of the separate read interface unit and the separate write interface unit enables a read to one segment of memory to take place simultaneously with a write from a different segment of memory. Thus, the provision of the separate read and write interfaces increases the bandwidth available for handling read and write access requests, resulting in improved performance and flexibility.

Returning to FIG. 1, if a read access request is issued by the data read interface unit 130, when the resultant data is returned over path 134, it is forwarded from the data read interface unit 130 over path 136 to the load store unit 80, where it is then returned over path 88 to the core 10, and, assuming that data value is cacheable, may also be passed to the data cache 90 for storing within the data cache.

With such an architecture as shown in FIG. 1, one type of instruction which causes a problem is a multi-access instruction which will be described hereafter as a swap instruction. A swap instruction is an instruction which specifies a read access request used to read a data value from an access address of a slave device such as memory 60 into a first register of the data processing apparatus, and further specifies that the read access request should be followed by a write access request used to write data from a second register of the data processing apparatus into that same access address of the slave device. Furthermore, the swap instruction requires that both the read access request and the write access request are performed without any intervening accesses to the slave device taking place.

As will be apparent from FIG. 1, the demultiplexer 120 will be arranged to issue the read access request of the swap instruction to the data read interface unit 130, and to issue the write access request of the swap instruction to the data write interface unit 140. The data read interface unit 130 will then be able to issue a read access request in the usual manner to the memory 60, which will result in the required data being retrieved over bus 134. However, for the write access request to then take place, the data read interface unit 130 would need to relinquish its control of the memory 60, so that the data write interface 140 can then issue the write access request. However, it cannot be ensured that the arbiter 70 will not also receive an intervening access request from some other interface unit, for example the interface unit of another processor, and accordingly it cannot be ensured that the write access request will be performed immediately after the read access request without any intervening access requests being processed by the memory 60.

In accordance with preferred embodiments of the present invention, this problem is solved by providing additional logic which ensures that in the event of a swap instruction, the data read interface unit 130 handles not only the read access request specified by the swap instruction, but also the write access request specified by the swap instruction. Since the data read interface unit 130 will now in very limited circumstances also need to be able to process write access requests, it will be appreciated that bus 134 can no longer be a read only bus. In preferred embodiments, bus 134 is hence provided by a "mostly read" bus which is configured so as to enable the data read interface unit 130 to perform a write access request in the above-described limited circumstances (i.e. when required to correctly process a swap instruction).

It will be appreciated that it will not necessarily always be the case that the swap instruction requires the read and write accesses to be performed directly on the memory 60. For example, if the memory address specified by the swap instruction is cacheable, the data value may still need to be read from the memory 60 as a result of the read access request, resulting in that data value returning via bus 134 and over path 136 into the load store unit 80, from where it is then stored within the data cache 90. However, the load store unit 80 can then ensure that the write access request is implemented immediately thereafter by writing the data value to the relevant entry in the data cache 90. For a "write back" cache, there would be no requirement at that stage to also write the data value in to the memory 60. Hence, in preferred embodiments, in the event that the swap instruction specifies a memory address which is cacheable, there will not necessarily be a requirement for the write access request to be performed directly on the memory 60, and accordingly there may be no requirement to ensure that that write access request is routed through to the read interface unit for handling. However, for swap instructions that specify non-cacheable addresses, there is a requirement to enable the data read interface unit 130 to handle both the read access request and the write access request of the swap instruction, and the manner in which this is achieved in preferred embodiments will now be described in more detail with reference to FIGS. 2 and 3.

Figure 2:
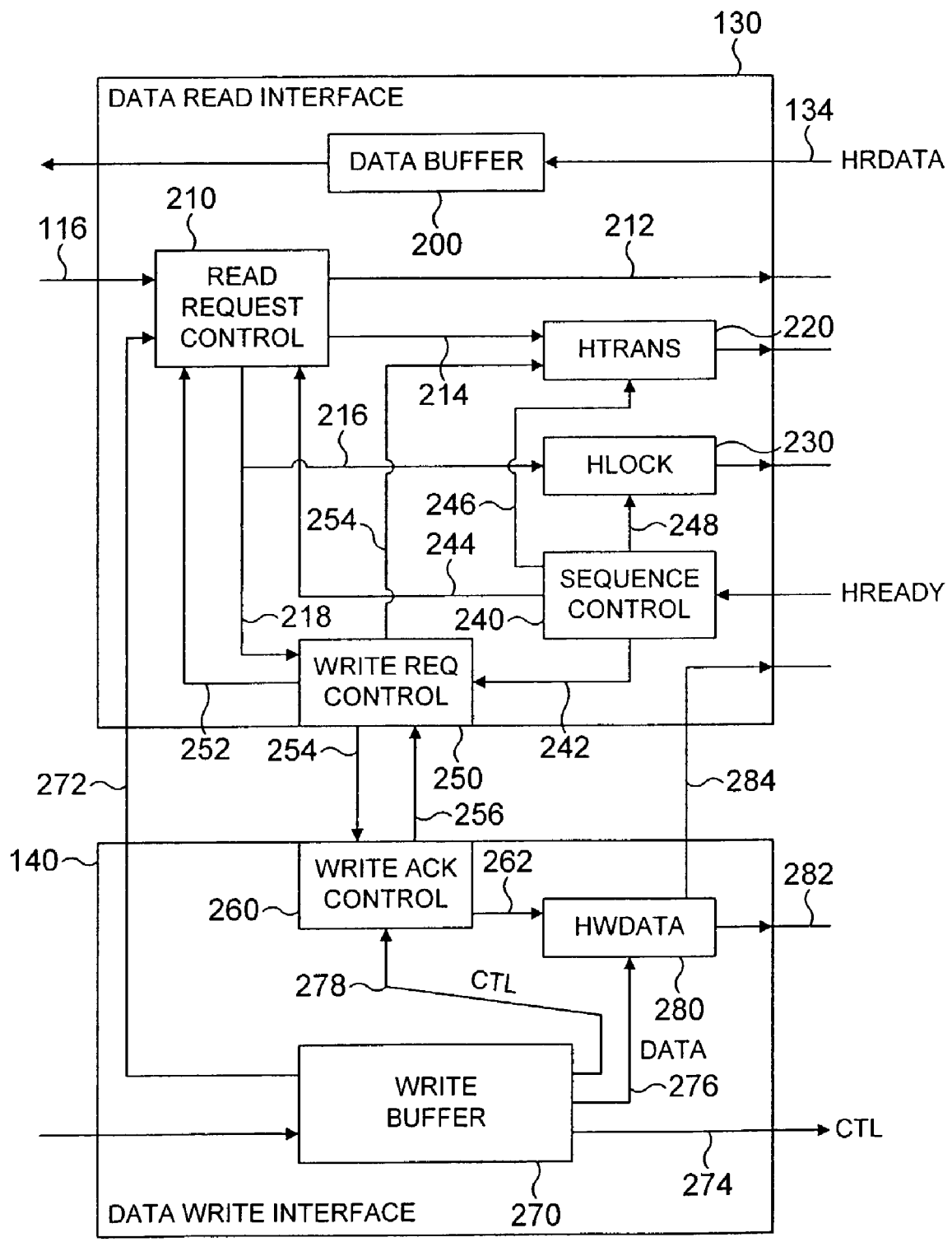
FIG. 2 is a block diagram illustrating in more detail the components of the data read interface and the data write interface used to handle a swap instruction in accordance with preferred embodiments of the present invention.
Figure 3:
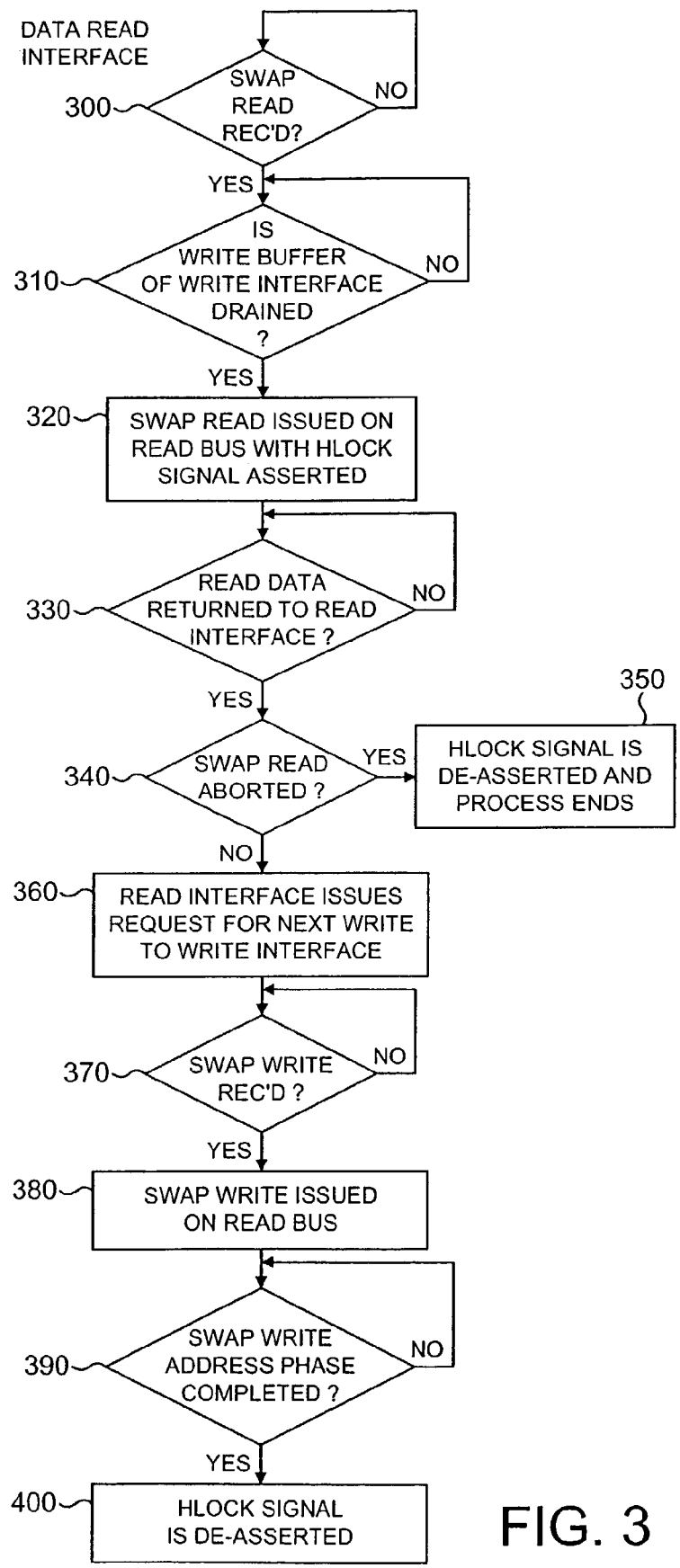
FIG. 3 is a flow diagram illustrating the processing performed with the data read interface when handling a swap instruction in accordance with preferred embodiments of the present invention.

FIG. 2 is a block diagram illustrating in more detail the elements provided within the data read interface 130 and the data write interface 140 to enable the data read interface 130 to handle the write access request part of the swap instruction. FIG. 3 is a flow diagram illustrating the processing performed within the data read interface 130 to handle a swap instruction in such instances.

At step 300, the data read interface 130 determines whether the read access request of the swap instruction has been received over path 116 from the demultiplexer 120, this read access request being received by the read request control block 210. If it determined at step 300 that the read access request has been received, then the process proceeds to step 310, where it is determined whether the write buffer 270 of the write interface unit 140 has been drained. To enable this determination, the write buffer 270 is arranged to issue over path 272 to the read request control block 210 a signal indicative of whether the write buffer is empty or not.

It should be noted from FIG. 1 that the load store unit 80 will ensure that the write access request specified by the swap instruction is not issued to the physical address queue 110 until the read data resulting from the read access request of the swap instruction has been returned over path 136, and accordingly following receipt of the read access request by the read request control block 210, no further write access requests will enter the write buffer 270 until the read access request has been processed. Hence, it will be appreciated that even if the write buffer 270 does contain some pending write access requests at the time that the read access request of the swap instruction is received by the read request control block 210, the contents of that write buffer will naturally drain away as those write access requests are processed by the data write interface unit 140.

Accordingly, at some point, a signal will be issued by the write buffer 270 over path 272 indicating that the write buffer has become drained, and accordingly the process will proceed from step 310 to step 320. At step 320, the read access request of the swap instruction is issued on to the read bus. Although in FIG. 1 the buses were identified as buses 36, 134, 144, respectively, it will be appreciated by those skilled in the art that those buses also incorporate the control paths 34, 132, 142, respectively.

Prior to being able to issue the read access request, the data read interface unit 130 needs to receive a set "HREADY" signal from the memory device 60 indicating that the memory is available to process a new access request. Typically, the HREADY signal will be broadcast by the memory unit 60 to all interface units that are capable of accessing that memory. The HREADY signal is received by a sequence control block 240 within the data read interface 130, and then passed over paths 242, 244, 246 and 248 to the write request control block 250, the read request control block 210, the "HTRANS" block 220 and the "HLOCK" block 230, respectively.

Upon receipt of the HREADY signal the read request control block 210 will issue any control signals required in connection with the read access request over path 212, and at the same time will issue signals over paths 214 and 216 to the HTRANS block 220 and the HLOCK block 230, respectively, to cause the HTRANS block 220 to issue the address for the read access request and the HLOCK block 230 to issue a set lock signal. Once the read interface unit 130 has been granted access to the memory 60, the lock signal serves to ensure that the read interface unit 130 will continue to have sole access to the memory 60 until it de-asserts the lock signal.

When the arbiter 70 instructs the multiplexer 50 to cause the read access request to be routed into the memory 60 for processing, this will subsequently result in the read data (referred to as HRDATA in FIG. 2) being returned over bus 134 to the data read interface 130, where it will be passed through a data buffer 200. Accordingly, once the read access request has been issued at step 320, the process proceeds to step 330, where it is determined whether the read data has been returned to the read interface. Once the read data has been returned, the process proceeds to step 340, where it is determined whether the read access request has been aborted, this being signalled by certain control information returned form the memory 60 with the read data. It is possible for the read access to be aborted for a number of reasons. For example, the memory 60 may determine that the data at the address indicated by the read access request is invalid, or that that data value is not readable given the current state of the system.

If it is determined at step 340 that the read access request has been aborted, then the process proceeds to step 350, where the HLOCK signal is de-asserted and the process performed by the data read interface 130 ends. In practice, the abort signal will be routed back to the load store unit 80 over path 136, and this will cause the load store unit to cancel the subsequent write access, thus aborting the swap instruction.

Assuming at step 340 it is determined that the read access request has not been aborted, then the process proceeds to step 360, where the read interface unit 130 issues a request to the write interface unit 140 for the next write access request received by the write interface unit 140. This is achieved by the read request control block 210 issuing a signal to the write request control block 250 over path 218, causing the write request control block to issue a request signal over path 254 to the write acknowledgement control block 260 of the data write interface 140. The signal is also passed to the HLOCK block 230 to cause the lock signal to continue to be asserted.

When a write access request reaches the front of the write buffer 270, it is routed to the "HWDATA" block 280 over path 276, which in the normal operation of the write interface unit 140 is arranged to issue the write data over path 282 whilst corresponding control data is output over path 274 from the write buffer. However, the write acknowledgement control block 260 is arranged when a data item is passed from the front of the write buffer 270 into the HWDATA block 280 to also receive control information over path 278. Since the write buffer 270 will have been empty before the read access request of the swap instruction is processed, the next instruction that will reach the front of the write buffer 270 will be the write access request of the swap instruction as routed to the data write interface 140 via the load store unit 80 and the physical address queue 110. Accordingly, once the write acknowledgement block 260 has received the request signal over path 254 it will react to the next set of control signals received over path 278 by sending an acknowledgement signal over path 256 to the write request control block 250 and also sending a control signal over path 262 to the HWDATA block 280, this control signal causing the HWDATA block 280 to then output at the appropriate point the data over path 284 rather than path 282. Path 284 is routed through the data read interface 130, and hence this process ensures that the write access request is actually output by the data read interface.

More particularly, referring back to FIG. 3, after the request has been issued over path 254 to the write acknowledgement control block 260, the process proceeds to step 370, where the data read interface 130 awaits confirmation that the write access request has been received, this being indicated by the acknowledgement signal returned over path 256 from the write acknowledgement control block 260 of the data write interface unit 140. Once the write access request has been received, the process proceeds to step 380, where the write access request of the swap instruction is issued onto the read bus.

Referring to FIG. 2, this is achieved by the write request control block 250 responding to the acknowledgement signal returned over path 256 by issuing a signal over path 254 to the HTRANS block 220 to cause the HTRANS block 220 to generate the address for the write access request. Since the address will be the same as that used for the read access request, this address information will still be retained within the read interface unit 130 and can readily be generated by the HTRANS block 220.

The HTRANS block 220 is arranged to generate the address for the write access the next time the HREADY signal is set at the end of a clock cycle, this being indicated by a signal received over path 246 from the sequence control block 240. At the same time, that set HREADY signal is routed via path 242 to the write request control block 250, where it is then routed over path 254 to the write acknowledgement control block 260 for routing over path 262 to the HWDATA block 280, causing the HWDATA block 280 to also at that time output over path 284 the write data corresponding to the write access request, this write data then appearing over the "mostly read" bus coupled to the read interface 130.

The next time an active HREADY signal is received from memory 60 by the sequence control block 240, this will cause the HTRANS block 220 to de-assert the address for the write access. However, the write data will continue at this time to be asserted by the HWDATA block 280 over the read bus of the read interface unit 130.

At this time, the lock signal can also be de-asserted by the HLOCK block 230, since it is now ensured that the write access is going to take place without any intervening accesses having occurred.

The next time a set HREADY signal is received from the memory 60 by the sequence control block 240, that set HREADY signal will again be routed via paths 242, 254 and 262 to the HWDATA block 280, to cause the HWDATA block to de-assert the write data. This set HREADY signal will also enable any other interface units to begin requesting access to the memory 60.

Returning to FIG. 3, it can hence be seen that once the write access request has been issued onto the read bus at step 380, the process proceeds to step 390, where it is determined whether the write address phase of the write access request has been completed (this having completed when the HTRANS block 220 de-asserts the write address), at which point the process then proceeds to step 400 where the HLOCK signal is de-asserted. Given the above description of the remainder of the write access request process, it will be appreciated that this will continue without any actions needing to be taken by the data read interface 130, other than the routing of the HREADY signal to the HWDATA block 280 to cause the write data to be de-asserted.

Figure 4:
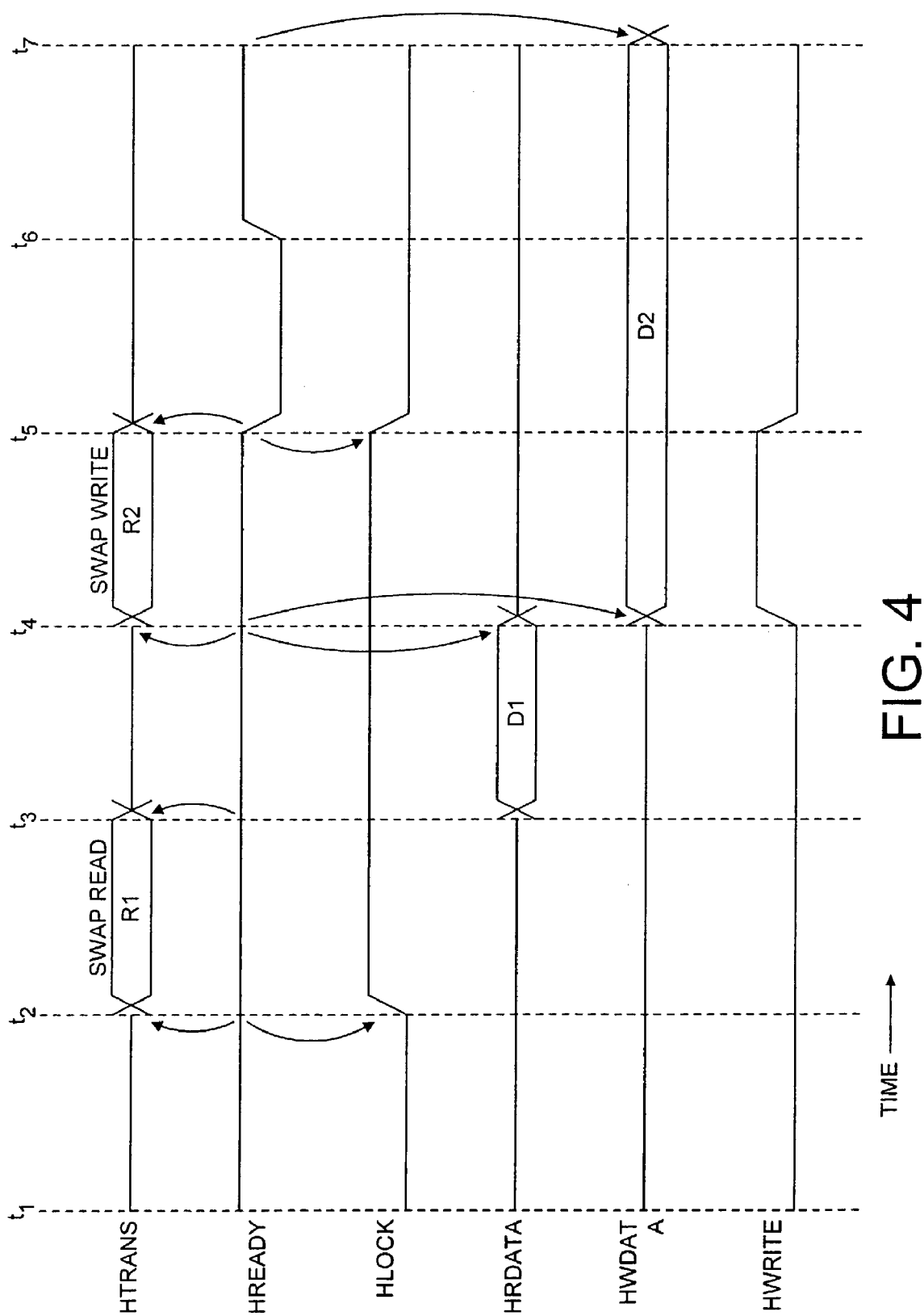
FIG. 4 is a timing diagram illustrating the interaction between various signals issued or received by the data read interface whilst handling a swap instruction in accordance with preferred embodiments of the present invention.

FIG. 4 is a timing diagram schematically illustrating an example of the state of the various signals output on the read bus 132, 134 coupled to the read interface unit 130 when performing the read and write accesses required by a swap instruction. At the end of a first clock cycle, i.e. at time $t_2$, the presence of a set HREADY signal will enable the HTRANS signal to be asserted in the next clock cycle to specify the address of the read access request. The HLOCK block 230 will also at that time assert the HLOCK signal. At time $t_3$, the continued assertion of the HREADY signal will enable the HTRANS signal to be de-asserted.

Assuming the HREADY signal is still asserted at the end of the next clock cycle, i.e. at time $t_4$, this will indicate that the read data has been able to returned during that clock cycle and accordingly will now be read into the data buffer 200 of the read interface unit 130.

The active HREADY signal at time $t_4$, will also cause the HTRANS block 220 to begin issuing the write address for the write access request, and will cause the HWDATA block 280 to begin issuing the write data.

If at time $t_5$ the HREADY signal is again asserted, this will signal to the HTRANS block 220 that it can now de-assert the write address, which in turn will signal to the HLOCK block 230 that it can now de-assert the HLOCK signal. If the HREADY signal were to be active at time $t_6$, this would be routed to the HWDATA block 280 to cause it to de-assert the write data. However, in the example illustrated in FIG. 4, it is assumed that it is going to take more that one cycle to write the data to memory, and accordingly the HREADY signal is not asserted at time $t_6$, this causing the HWDATA block 280 to maintain the write data for a further cycle. The assertion of the HREADY signal at the end of the subsequent cycle, i.e. at time $t_7$, is then used to cause the HWDATA block 280 to de-assert the write data, thereby completing both the read and the write accesses required by the swap instruction.

The "HWRITE" signal indicated in FIG. 4 is a control signal that is routed by the read request control block 210 over path 212 to indicate whether the access request specified by the HTRANS signal is a read or a write access, the HWRITE signal being set to a logic 0 value to indicate a read access and to a logic 1 value to indicate a write access. Accordingly, with reference to FIG. 4, it will be seen that the HWRITE signal transitions to a logic 1 value for the clock cycle between times $t_4$ and $t_5$.

Given the above description, it will be appreciated that preferred embodiments of the present invention provide a mechanism whereby separate read and write interface units can be used to improve the bandwidth, performance and flexibility of the data processing apparatus in processing read and write accesses, whilst still enabling a swap instruction to be handled in a manner that will ensure that no intervening accesses occur between the read access and the write access specified by the swap instruction.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, comprising:
   a processor operable to execute instructions;
   a first master logic unit and a second master logic unit operable to process access requests generated during execution of said instructions, said access requests specifying accesses to a slave device, the first master logic unit being operable to access the slave device via a first bus, and the second master logic unit being operable to access the slave device via a second bus;
   routing logic operable to determine, for each access request, which master logic unit is to process that access request, the first master logic unit being arranged to process access requests of a first type, and the second master logic unit being arranged to process access requests of a second type;
   at least one of said instructions being a multi-access instruction executable to cause both an access request of the first type and an access request of the second type to be generated, the multi-access instruction requiring that the accesses to the slave device specified by the access requests of the first and second type are made without any intervening accesses to the slave device taking place;
   the routing logic being arranged in the event of execution of the multi-access instruction to cause both the access request of the first type and the access request of the second type specified by the multi-access instruction to be processed by said first master logic unit;
   the first master logic unit being arranged, when processing the access request of the first type and the access request of the second type specified by the multi-access instruction, to issue a lock signal used to ensure that the first master logic unit is granted sole access to the slave device whilst the first master logic unit is processing the access requests of the first and second type.

2. A data processing apparatus as claimed in claim 1, wherein the routing logic comprises first routing logic operable to route access requests of the first type to the first master logic unit and to route access requests of the second type to the second master logic unit, and second routing logic operable in the event of execution of the multi-access instruction to cause the access request of the second type specified by the multi-access instruction to be routed from the second master logic unit to the first master logic unit for processing by the first master logic unit.

3. A data processing apparatus as claimed in claim 2, wherein the second routing logic is provided within the first master logic unit.

4. A data processing apparatus as claimed in claim 2, wherein the second routing logic comprises requester logic operable to issue a request to the second master logic unit to cause the second master logic unit to route to the first master logic unit the access request of the second type specified by the multi-access instruction.

5. A data processing apparatus as claimed in claim 2, wherein the second master logic unit has a buffer for buffering access requests received from the first routing logic prior to processing of those access requests, the first master logic unit being arranged to defer processing of the access requests specified by the multi-access instruction until the buffer has been drained of any access requests not specified by the multi-access instruction.

6. A data processing apparatus as claimed in claim 1, wherein the multi-access instruction specifies that the access request of the first type is to be processed before the access request of the second type.

7. A data processing apparatus as claimed in claim 2, wherein the multi-access instruction specifies that the access request of the first type is to be processed before the access request of the second type, and wherein the first routing logic is arranged to defer providing to the second master logic unit the access request of the second type specified by the multi-access instruction until the access request of the first type specified by the multi-access instruction has been processed by the first master logic unit.

8. A data processing apparatus as claimed in claim 7, wherein the second master logic unit has a buffer for buffering access requests received from the first routing logic prior to processing of those access requests, the first master logic unit being arranged to defer processing of the access requests specified by the multi-access instruction until the buffer has been drained of any access requests not specified by the multi-access instruction, and wherein the first master logic unit is arranged to defer processing of the first access request specified by the multi-access instruction until the buffer of the second master logic unit has been emptied.

9. A data processing apparatus as claimed in claim 8, wherein the second master logic unit is arranged to issue a buffer status signal to the first master logic unit indicating whether the buffer is empty.

10. A data processing apparatus as claimed in claim 1, wherein the first master logic unit is a read interface unit, and the access requests of the first type are read access requests.

11. A data processing apparatus as claimed in claim 1, wherein the second master logic unit is a write interface unit, and the access requests of the second type are write access requests.

12. A data processing apparatus as claimed in claim 11, wherein the first master logic unit is a read interface unit, and the access requests of the first type are read access requests, and wherein the multi-access instruction is a swap instruction specifying a read access request used to read data from an access address of the slave device into a first register of the data processing apparatus, followed by a write access request used to write data from a second register of the data processing apparatus into the access address of the slave device.

13. A data processing apparatus as claimed in claim 12, wherein the slave device is a memory.

14. A method of handling a multi-access instruction in a data processing apparatus having a processor operable to execute instructions, and a first master logic unit and a second master logic unit operable to process access requests generated during execution of said instructions, said access requests specifying accesses to a slave device, the first master logic unit being operable to access the slave device via a first bus, and the second master logic unit being operable to access the slave device via a second bus, the first master logic unit being arranged to process access requests of a first type, and the second master logic unit being arranged to process access requests of a second type, the method comprising the steps of:

(a) executing the multi-access instruction to cause both an access request of the first type and an access request of the second type to be generated, the multi-access instruction requiring that the accesses to the slave device specified by the access requests of the first and second type are made without any intervening accesses to the slave device taking place;

(b) routing both the access request of the first type and the access request of the second type specified by the multi-access instruction so as to cause both of those access requests to be processed by said first master logic unit;

(c) whilst said first master logic unit is processing the access request of the first type and the access request of the second type specified by the multi-access instruction, issuing a lock signal operable to ensure that the first master logic unit is granted sole access to the slave device whilst the first master logic unit is processing the access requests of the first and second type.

15. A method as claimed in claim 14, wherein the routing step (b) comprises the steps of:

(i) routing access requests of the first type to the first master logic unit and routing access requests of the second type to the second master logic unit; and (ii) in the event of execution of the multi-access instruction, routing the access request of the second type specified by the multi-access instruction from the second master logic unit to the first master logic unit for processing by the first master logic unit.

16. A method as claimed in claim 15, wherein the routing step (ii) is invoked by logic provided within the first master logic unit.

17. A method as claimed in claim 15, wherein the routing step (ii) comprises the step of issuing a request to the second master logic unit to cause the second master logic unit to route to the first master logic unit the access request of the second type specified by the multi-access instruction.

18. A method as claimed in claim 15, wherein the second master logic unit has a buffer for buffering access requests received via said routing step (i) prior to processing of those access requests, the first master logic unit being arranged to defer processing of the access requests specified by the multi-access instruction until the buffer has been drained of any access requests not specified by the multi-access instruction.

19. A method as claimed in claim 14, wherein the multi-access instruction specifies that the access request of the first type is to be processed before the access request of the second type.

20. A method as claimed in claim 15, wherein the multi-access instruction specifies that the access request of the first type is to be processed before the access request of the second type, and wherein during the routing step (i), the provision to the second master logic unit of the access request of the second type specified by the multi-access instruction is deferred until the access request of the first type specified by the multi-access instruction has been processed by the first master logic unit.

21. A method as claimed in claim 20, wherein the second master logic unit has a buffer for buffering access requests received via said routing step (i) prior to processing of those access requests, the first master logic unit being arranged to defer processing of the access requests specified by the multi-access instruction until the buffer has been drained of any access requests not specified by the multi-access instruction, and wherein the first master logic unit is arranged to defer processing of the first access request specified by the multi-access instruction until the buffer of the second master logic unit has been emptied.

22. A method as claimed in claim 21, wherein the second master logic unit is arranged to issue a buffer status signal to the first master logic unit indicating whether the buffer is empty.

23. A method as claimed in claim 14, wherein the first master logic unit is a read interface unit, and the access requests of the first type are read access requests.

24. A method as claimed in claim 14, wherein the second master logic unit is a write interface unit, and the access requests of the second type are write access requests.

25. A method as claimed in claim 24, wherein the first master logic unit is a read interface unit, and the access requests of the first type are read access requests, and wherein the multi-access instruction is a swap instruction specifying a read access request used to read data from an access address of the slave device into a first register of the data processing apparatus, followed by a write access request used to write data from a second register of the data processing apparatus into the access address of the slave device.

26. A method as claimed in claim 25, wherein the slave device is a memory.

27. A computer readable medium carrying a computer program operative to control a data processing apparatus to handle a multi-access instruction in accordance with the method of claim 14.

* * * * *